United States Patent
McCrary (10) Patent No.: US 11,403,729 B2
(45) Date of Patent: Aug. 2, 2022

(54) DYNAMIC TRANSPARENT RECONFIGURATION OF A MULTI-TENANT GRAPHICS PROCESSING UNIT

(71) Applicant: ADVANCED MICRO DEVICES, INC., Santa Clara, CA (US)

(72) Inventor: Rex Eldon McCrary, Orlando, FL (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 16/804,345

(22) Filed: Feb. 28, 2020

(65) Prior Publication Data

US 2021/0272229 A1 Sep. 2, 2021

(51) Int. Cl.
| | |
|---|---|
| G06T 1/20 | (2006.01) |
| G06T 15/00 | (2011.01) |
| G06F 9/50 | (2006.01) |
| G06F 9/30 | (2018.01) |
| G06F 9/48 | (2006.01) |

(52) U.S. Cl.
CPC ............ *G06T 1/20* (2013.01); *G06F 9/30098* (2013.01); *G06F 9/4881* (2013.01); *G06F 9/5016* (2013.01); *G06F 9/5061* (2013.01); *G06T 15/005* (2013.01)

(58) Field of Classification Search
CPC ..... G06T 1/20; G06T 15/005; G06F 9/30098; G06F 9/4881; G06F 9/5061; G06F 9/5016
USPC ........................................................ 345/530
See application file for complete search history.

(56) References Cited

U.S. PATENT DOCUMENTS

| | | | |
|---|---|---|---|
| 2008/0074433 A1* | 3/2008 | Jiao ....................... | G06T 15/005 |
| | | | 345/522 |
| 2010/0123717 A1* | 5/2010 | Jiao ....................... | G06T 15/005 |
| | | | 345/426 |
| 2011/0080415 A1 | 4/2011 | Duluk, Jr. et al. | |
| 2013/0155077 A1 | 6/2013 | Hartog et al. | |
| 2014/0176583 A1 | 6/2014 | Abiezzi et al. | |
| 2018/0114290 A1* | 4/2018 | Paltashev .............. | G06T 15/005 |

FOREIGN PATENT DOCUMENTS

KR 10-2012-0064093 6/2012

OTHER PUBLICATIONS

International Search Report dated Jun. 15, 2021 in Application No. PCT/US2021/019855, 10 pages.

* cited by examiner

*Primary Examiner* — Hai Tao Sun (57) ABSTRACT

An apparatus such as a graphics processing unit (GPU) includes shader engines and front end (FE) circuits. Subsets of the FE circuits are configured to schedule commands for execution on corresponding subsets of the shader engines. The apparatus also includes a set of physical paths configured to convey information from the FE circuits to a memory via the shader engines. Subsets of the physical paths are allocated to the subsets of the FE circuits and the corresponding subsets of the shader engines. The apparatus further includes a scheduler configured to receive a reconfiguration request and modify the set of physical paths based on the reconfiguration request. In some cases, the reconfiguration request is provided by a central processing unit (CPU) that requests the modification based on characteristics of applications generating the commands.

23 Claims, 8 Drawing Sheets

DYNAMIC TRANSPARENT RECONFIGURATION OF A MULTI-TENANT GRAPHICS PROCESSING UNIT

BACKGROUND

Processing on a graphics processing unit (GPU) is typically initiated by application programming interface (API) calls (e.g., draw calls) that are processed by a central processing unit (CPU). A draw call is a command that is generated by the CPU and transmitted to the GPU to instruct the GPU to render an object (or a portion of an object) in a frame. The draw call includes information defining textures, states, shaders, rendering objects, buffers, and the like that are used by the GPU to render the object or portion thereof. In response to receiving a draw call, the GPU renders the object to produce values of pixels that are provided to a display, which uses the pixel values to display an image that represents the rendered object.

Gaming and other graphics-intensive applications are voracious consumers of the physical resources of GPUs, which include shader engines and fixed function hardware units that are used to implement graphics pipelines as user-defined reconfigurable virtual pipelines. For example, a conventional graphics pipeline for processing three-dimensional (3-D) graphics is formed of a sequence of fixed-function hardware block arrangements supported by programmable shaders. These arrangements are usually configured via a graphics application programming interface (API) such as the APIs defined by Microsoft DX 11/12, Khronos Group, OpenGL, Vulkan, and the like. Games are typically played on consoles (such as Xbox and PlayStation 4) and personal computers (PCs) that are optimized to handle the graphics processing requirements of the games. However, consoles and gaming PCs are expensive and some games are only available in one of the gaming formats. Cloud gaming overcomes these drawbacks by moving the graphics processing to GPUs in cloud servers that stream the rendered graphics to the user, thereby reducing the user's hardware requirements and allowing the user to play games in multiple formats.

BRIEF DESCRIPTION OF THE DRAWINGS

The present disclosure is better understood, and its numerous features and advantages made apparent to those skilled in the art by referencing the accompanying drawings. The use of the same reference symbols in different drawings indicates similar or identical items.

DETAILED DESCRIPTION

A graphics processing unit (GPU) in a cloud server includes front end (FE) hardware to handle tasks such as fetching commands, handling jitter, performing geometry operations, and performing ray tracing. The FE hardware typically includes command fetchers, queues such as first-in-first-out (FIFO) buffers to hold fetched commands, and a scheduler that schedules commands from the command buffer for execution on shader engines in the GPU. The shader engines are implemented using one or more processors and one or more arithmetic logic units (ALUs) to execute commands provided by the FE hardware. Results produced by the shaders, such as values of shaded pixels, are output to one or more caches that store frequently used information that is also stored in corresponding memories. The GPU therefore includes memory or registers to hold results, caches, ports, and interfaces between these entities. Information flows from the FE hardware to the memory via paths that include command buses to carry commands from the FE hardware to the shader engines, caches to store output from the shader engines, and memory channels to convey cached information to the memory. The resources of the GPU therefore include the bandwidth used to convey commands and data over the command bus to the shader engines, the caches that store results produced by the shader engines, and the memory channels that convey information between the caches and the memory.

The set of GPUs in a cloud server executes a dynamically changing mix of different applications. For example, a cloud server could be executing four easy games (with relatively low resource consumption) during a first time interval, two moderate games (with middling resource consumption) during a second time interval, and a single complex game (with relatively high resource consumption) during a third time interval. The set of GPUs are not able to determine the requirements of the applications that are providing commands for execution on the set of GPUs because the commands are generated for the application by the central processing unit (CPU) and then provided to the set of GPUs for execution.

FIGS. 1-9 disclose embodiments of a GPU that is transparently reconfigured to execute commands generated by one or more applications in response to a packet such as an application programming interface (API) packet that is received from a CPU that is executing the one or applications. The CPU generates the packet in response to the GPU completing execution of commands generated by one or more of the applications. For example, if the GPU is concurrently executing commands for first and second applications, the GPU can transmit a message to the CPU that indicates that commands for the first application have completed execution. In response, the CPU schedules a third application to the GPU and generates an API packet that instructs the GPU to modify its configuration to support concurrent execution of the first and third applications. Some embodiments of the GPU include multiple front end (FE) circuits, a command bus that implements a set of lanes, a set of shader engines, a cache that is shared by the shader engines, and a data fabric that supports a set of memory channels between the cache and a memory. Modifying the configuration of the GPU therefore includes modifying allocation of the FE circuits that schedule commands for execution on subsets of the shader engines, as well as modifying the partitioning of lanes of the command bus, the cache, and the set of memory channels between the applications that are executing concurrently on the GPU. The configuration of the GPU is determined based on values of registers in the GPU. In some embodiments, the registers include a first set of registers that indicate a mapping of the FE circuits to the shader engines, a second set of registers that indicates a partition of lanes of the command bus, a third set of registers to partition the cache, and a fourth set of registers to partition the set of memory channels. The registers are programmed based on information included in the API packet.

Figure 1:
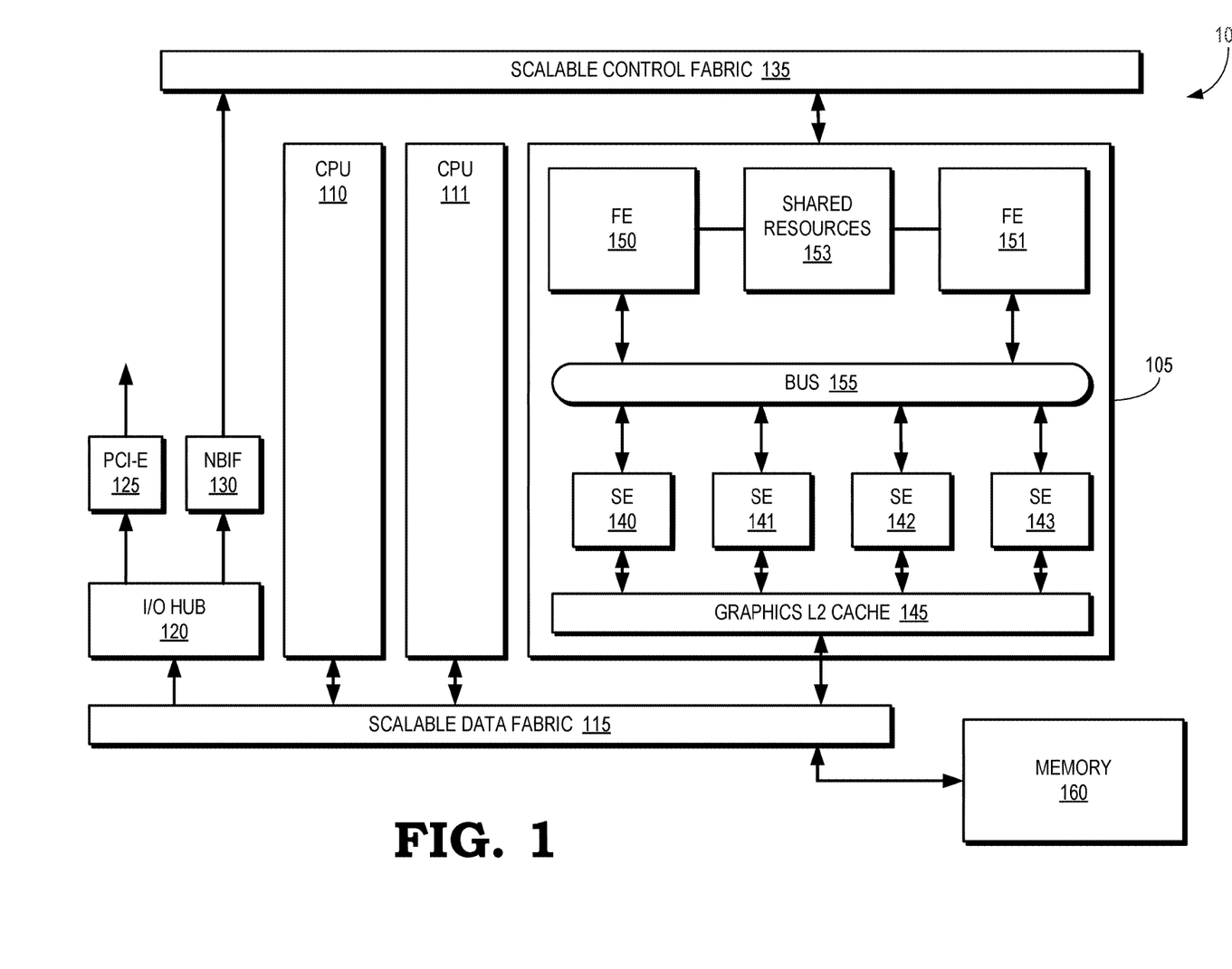
FIG. 1 is a block diagram of a processing system that implements spatial partitioning in a multi-tenancy graphics processing unit (GPU) according to some embodiments.

FIG. 1 is a block diagram of a processing system 100 that implements spatial partitioning in a multi-tenancy graphics processing unit (GPU) 105 according to some embodiments. The processing system 100 includes one or more central processing units (CPUs) 110, 111. Although two CPUs 110, 111 are shown in FIG. 1, some embodiments of the processing system 100 include more or fewer CPUs. A scalable data fabric (SDF) 115 supports data flows between endpoints within the processing system 100. Some embodiments of the SDF 115 support data flows between connecting points such as peripheral component interface (PCI) physical layers, memory controllers, universal serial bus (USB) hubs, computing and execution units including the GPU 105 and the CPUs 110, 111, as well as other endpoints. In the illustrated embodiment, the SDF 115 is connected to an input/output (I/O) hub 120, which is in turn connected to a PCI express (PCI-E) bus 125 and a north bound interface (NBIF) 130. The processing system 100 also includes a scalable control fabric (SCF) 135 is a control communication plane that conveys system control signals within the processing system 100. Examples of system control signals are control signals used to support thermal and power management, tests, security, and the like.

The GPU 105 includes a set of shader engines (SE) 140, 141, 142, 143 (collectively referred to herein as "the SE 140-143") that are used to execute commands concurrently or in parallel. Some embodiments of the SE 140-143 are configured using information in draw calls received from one of the CPUs 110, 111 to shade vertices of primitives that represent a model of a scene. The SE 140-143 also shade the pixels generated based on the shaded primitives and provide the shaded pixels to a display for presentation for user, e.g., via the I/O hub 120. Although four shader engines are shown in FIG. 1, some embodiments of the GPU 105 include more or fewer shader engines. The SE 140-143 are connected to a graphics level 2 (L2) cache 145 that stores frequently used data and instructions. In some embodiments, the L2 cache 145 is connected to one or more level 1 (L1) caches that are implemented in the SE 140-143 and one or more L3 caches (or other last level caches) implemented in the processing system 100. The caches form a cache hierarchy that includes the L2 cache 145. The other caches in the cache hierarchy are not shown in FIG. 1 in the interest of clarity.

Front end (FE) circuitry in the GPU 105 fetches primitives for geometry workloads, performs scheduling of the geometry workloads for execution on the shader engines and, in some cases, handles serial synchronization, state updates, draw calls, cache activities, and tessellation of primitives. The FE circuitry in the GPU 105 includes FE circuits 150, 151, although some embodiments of the FE circuitry are partitioned to include additional FE circuits, as discussed herein. The FE circuitry also includes (or has access to) shared resources 153 that are shared by (and partitioned between) the FE circuits 150, 151. For example, the shared resources 153 are partitioned into two portions that are separately allocated to the FE circuits 150, 151 when both the FE circuits 150, 151 are active and executing different threads or applications. For another example, the shared resources 153 are all allocated to a single FE circuit if only one of the FE circuits 150, 151 is active or if the combined resources of the FE circuits 150, 151 are used to support a single thread or application. The shared resources 153 include caches, arithmetic logic units (ALUs), and the like. The FE circuits 150, 151 receive command buffers for execution on the SE 140-143 and provide scheduled commands to the SE 140-143 via a bus 155. Some embodiments of the bus 155 are implemented as a graphics register bus manager (GRBM) that acts as a hub for register read and write operations that support multiple masters and multiple slaves. The GPU 105 and the CPUs 110, 111 communicate with a memory 160 via the SDF 115.

The CPUs 110, 111 execute one or more applications that generate commands for execution on the GPU 105. Some embodiments of the CPUs 110, 111 initiate execution of commands on the GPU using application programming interface (API) calls (e.g., draw calls) that are transmitted to the GPU 105 to instruct the GPU 105 to execute the command, e.g., by rendering an object (or a portion of an object) in a frame. The GPU 105 operates in different spatial partitioning modes. Some embodiments of the GPU 105 support first and second spatial partitioning modes. In the first mode, the FE circuit 150 schedules commands such as geometry workloads for the SE 140-143. In the second mode, the FE circuit 150 schedules commands from a first application for a first subset of the SE 140-143 and the FE circuit 150 schedules commands for a second application for a second subset of the SE 140-143. The first subset includes the SE 140, 141 and the second subset includes the SE 142, 143, although other groupings of the SE 140-143 into subsets are used in some embodiments.

The GPU 105 supports reconfigurable physical paths to convey information from the FE circuits 150, 151 to the memory 160 via the SE 140-143. Subsets of the physical paths are allocated to the subsets of the FE circuits 150, 151 and the corresponding subsets of the 140-143. For example, in the second mode described above, a first physical path is allocated to the FE circuit 150 and the SE 140, 141. A second physical path is allocated to the FE circuit 150, 151 and the SE 142, 143. The GPU 105 is therefore able to execute commands concurrently for the first and second applications using the first and second paths. Allocation of the physical paths and configuration of the GPU 105 is performed cooperatively by the GPU 105 and the CPUs 110, 111 that are executing the applications. In some embodiments, the CPUs 110, 111 request a reconfiguration based on characteristics of the applications or changes in the characteristics of the applications. Examples of the characteristics that are determined the reconfiguration of the GPU 105 include a number of applications executing on the CPUs 110, 111, a complexity of the applications, a graphics resolution for the applications, and the like. The CPUs 110, 111 transmit reconfiguration requests to the GPU 105, which modifies the physical paths based on the reconfiguration request, as discussed below.

Figure 2:
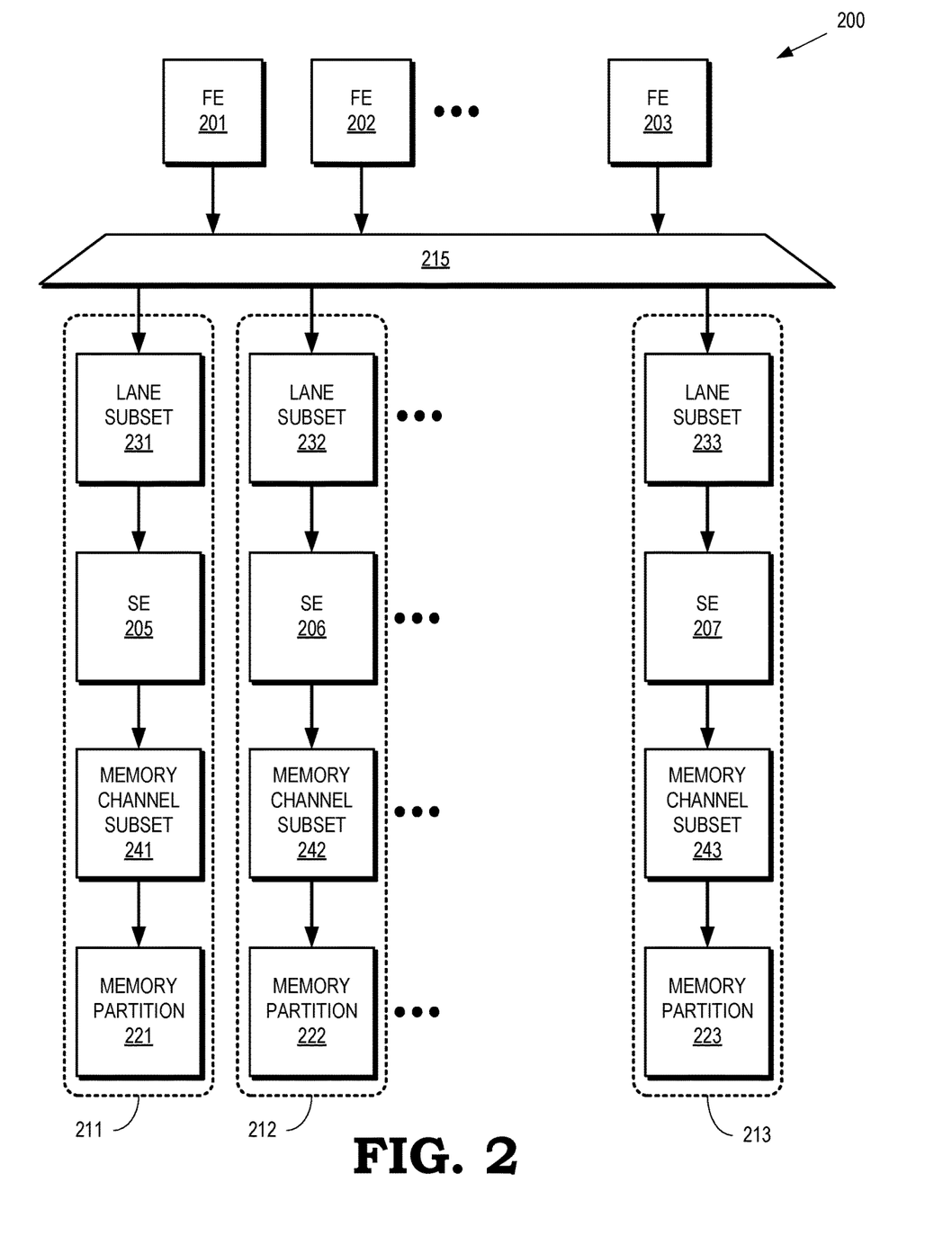
FIG. 2 is a block diagram of a GPU that uses flexible spatial partitioning to improve hardware utilization according to some embodiments.

FIG. 2 is a block diagram of a GPU 200 that uses flexible spatial partitioning to improve hardware utilization according to some embodiments. The GPU 200 is used to implement some embodiments of the GPU 105 shown in FIG. 1. The GPU 200 includes a set of FE circuits 201, 202, 203, which are collectively referred to herein as "the FE circuits 201-203." As used herein, the phrase "set of FE circuits" refers to different physical components that are turned on or off as needed, as well as different threads that utilize a multithreaded FE circuit. As discussed herein, the FE circuits 201-203 perform front end functionality including scheduling command buffers for execution on corresponding SE 205, 206, 207, which are collectively referred to herein as "the SE 205-207." The FE circuits 201-203 are selectively connected to different paths that are formed by spatially partitioning the resources of the GPU 200. In the illustrated embodiment, the FE circuits 201-203 are selectively connected to the paths 211, 212, 213 using switching circuitry 215. Although the switching circuitry 215 is represented as a demultiplexer in FIG. 2, the switching circuitry 215 can also include one or more switches, data fabrics, routers, multiplexers, demultiplexers, and the like. The switching circuitry 215, as well as other portions of the spatially partitioned paths, are configured based on values stored in configuration registers (not shown in FIG. 2 in the interest of clarity).

The spatially partitioned paths 211-213 provide paths for commands and data that flow from the FE circuits 201-203 to a memory via the SE 205-207. In the illustrated embodiment, the memory is partitioned into memory partitions 221, 222, 223, which are collectively referred to herein as "the memory partitions 221-223." The resources of the GPU 200 include a command bus that has multiple lanes to convey information between the FE circuits 201-203 and the SE 205-207. The spatially partitioned paths therefore include subsets 231, 232, 233 of the lanes of the command bus, which are collectively referred to herein as "the lane subsets 231-233." The resources of the GPU 200 also include a set of memory channels that convey information produced by the SE 205-207 to the memory. The spatially partitioned paths therefore include subsets 241, 242, 243 of the memory channels, which are collectively referred to herein as "the memory channel subsets 241-243."

The GPU 200 configures or reconfigures the spatially partitioned paths 211-213 based on requests received from a CPU that is executing one or more applications that generate commands for execution on the GPU 200. As discussed herein, the GPU 200 receives the request from the CPU and modifies allocation of the resources of the spatially partitioned paths 211-213 based on information included in the request. The CPU generates the request based on characteristics of the applications that are generating commands for execution on the GPU 200. Allocation of the FE circuits 201-203, the SE 205-207, and the resources of the spatially partitioned paths 211-213 is determined so that the resources of the GPU 200 are fully utilized when executing different numbers of applications or threads. For example, if a single thread is executing on the GPU 200, the FE circuits 201-203, the SE 205-207, and the resources of the spatially partitioned paths 211-213 are allocated to the single thread. For another example, if multiple threads are executing on the GPU 200, the FE circuits 201-203, the SE 205-207, and the resources of the spatially partitioned paths 211-213 are partitioned and shared between the multiple threads, as discussed herein.

In some embodiments, the configuration of the GPU 200 is indicated in a set of registers (not shown in FIG. 2 in the interest of clarity). In the illustrated embodiment, the switching circuitry 215 maps each of the FE circuits 201-203 to a corresponding one of the paths 211-213. However, the switching circuitry 215 also selectively and reconfigurably maps subsets of the FE circuits 201-203 to subsets or combinations of the paths 211-213. Furthermore, in some embodiments, the paths 211-213 include multiple SE 205-207 and corresponding resources of the GPU 200, as discussed herein.

Figure 3:
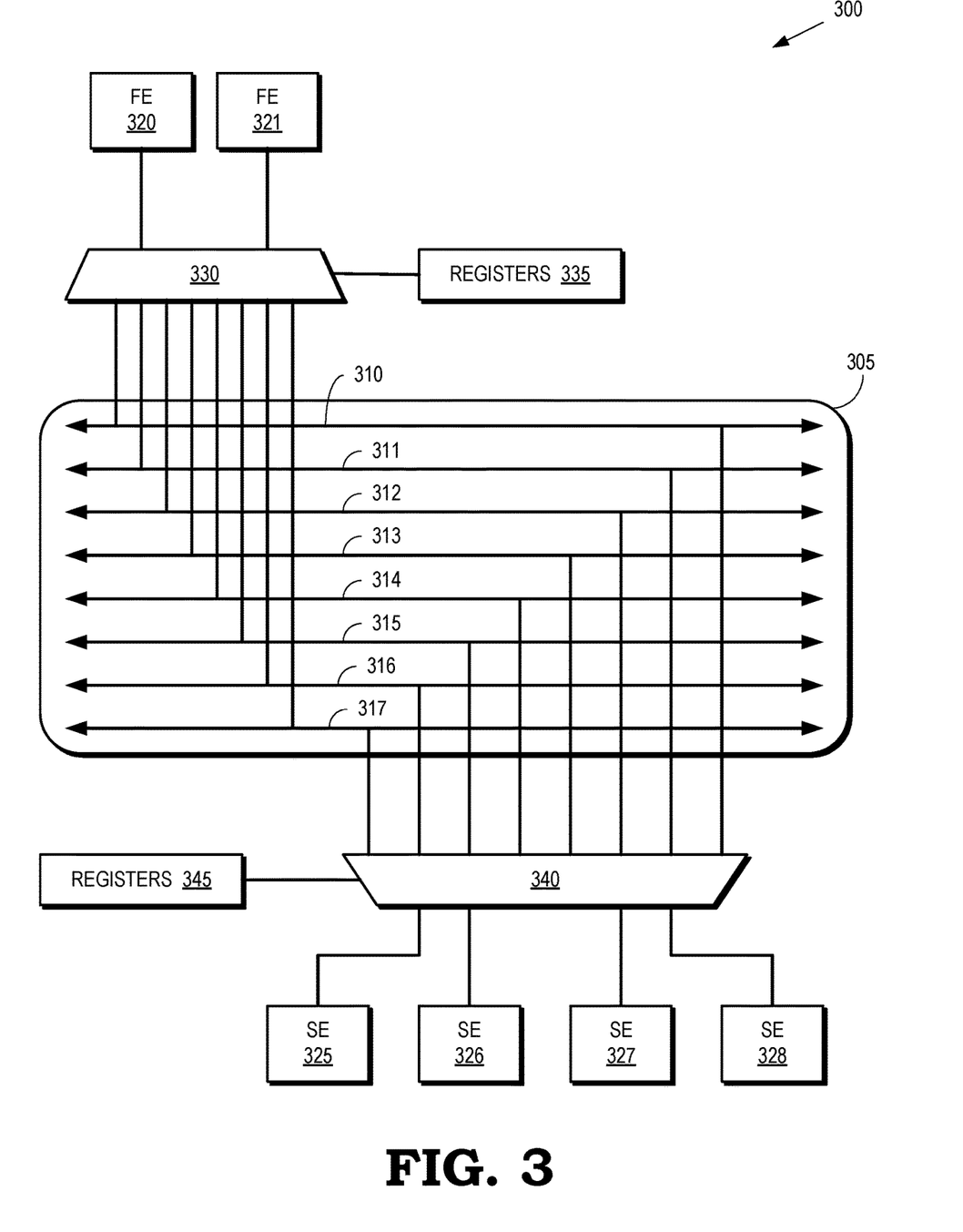
FIG. 3 is a block diagram of a portion of the GPU that includes a command bus that is configured for spatial partitioning according to some embodiments.

FIG. 3 is a block diagram of a portion 300 of the GPU that includes a command bus 305 that is configured for spatial partitioning according to some embodiments. The portion 300 is used to implement some embodiments of the GPU 105 shown in FIG. 1. The command bus 305 includes lanes 310, 311, 312, 313, 314, 315, 316, 317 (collectively referred to herein as "the lanes 310-317") that independently convey information between a set of FE circuits 320, 321 and a set of SE 325, 326, 327, 328, which are collectively referred to herein as "the SE 325-328."

The portion 300 includes switching circuitry 330 that selectively connects subsets of the FE circuit 320, 321 to corresponding subsets of the lanes 310-317. In some embodiments, the switching circuitry 330 is configured based on information stored in one or more registers 335. The portion 300 also includes switching circuitry 340 that selectively connects subsets of the lanes 310-317 to subsets of the SE 325-328. Mutually exclusive subsets of the lanes 310-317 are provided to convey information between the subsets of the FE circuitry 320, 321 and the corresponding subsets of the SE 325-328, which provides isolation between the commands processed by the portion 300 of the GPU for different allocations that are associated with the different physical paths.

The switching circuitry 340 is configured (or reconfigured) in response to requests received from a CPU that is executing applications that generate commands for execution by the GPU. In some embodiments, the switching circuitry 340 is configured based on information stored in one or more registers 345. The information stored in the registers 335, 345 is determined based on a mapping that associates subsets of the FE circuitry 320, 321 with corresponding subsets of the SE 325-328. Resources of the GPU, including the lanes 310-317, are allocated to each combination of a subset of the FE circuitry 320, 321 and a corresponding subset of the SE 325-328. The switching circuitry 330, 340 uses the information stored in the registers 335, 345 to partition the lanes 310-317 to form physical paths between the subsets of the FE circuitry 320, 321 and the corresponding subsets of the SE 325-328. The registers 335, 345 are programmed based on information received in requests from the CPU, as discussed herein.

Figure 4:
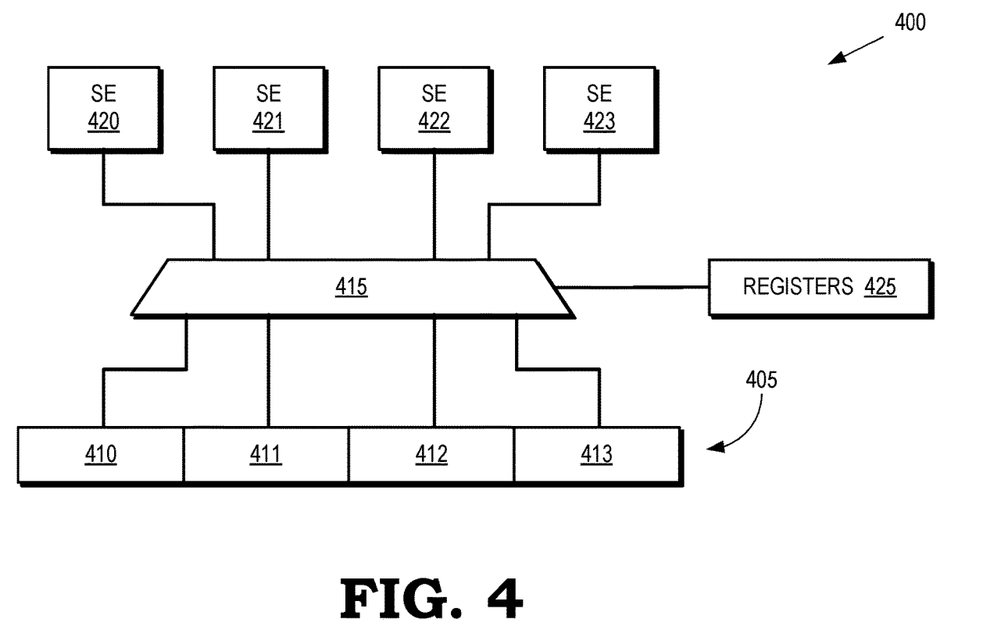
FIG. 4 is a block diagram of a portion of a GPU that includes a cache that is available for spatial partitioning according to some embodiments.

FIG. 4 is a block diagram of a portion 400 of a GPU that includes a cache 405 that is available for spatial partitioning according to some embodiments. The portion 400 is used to implement some embodiments of the GPU 105 shown in FIG. 1. The cache 405 is selectively partitioned to allocate portions 410, 411, 412, 413 (collectively referred to herein as "the cache portions 410-413") to different physical paths associated with different applications and subsets of FE circuitry. The portion 400 of the GPU also includes switching circuitry 415 that selectively connects subsets of SE 420, 421, 422, 423 (collectively referred to herein as "the SE 420-423") to the cache portions 410-413. In the illustrated embodiment, the cache 405 is partitioned so that the cache portions 410-413 are part of different physical paths. The switching circuitry 415 connects the SE 420 to the cache portion 410, the SE 421 to the cache portion 411, the SE 422 to the cache portion 412, and the SE 423 to the cache portion 413. The SE 420-423 therefore have exclusive access to their corresponding cache portions 410-413 and the information stored in the cache portions 410-413 by the SE 420-423 is isolated from the information stored in other cache portions 410-413 by other SE 420-423.

The switching circuitry 415 is configured (or reconfigured) in response to requests received from a CPU that is executing applications that generate commands for execution by the GPU. In some embodiments, the switching circuitry 415 is configured based on information stored in the registers 425. The information stored in the registers 425 associates the SE 420-423 with corresponding cache portions 410-413 to form a portion of the paths that link the SE 420-423 to a memory (not shown in FIG. 4 in the interest of clarity). The registers 425 are programmed based on information in requests received from a CPU that is executing applications that generate commands for execution by the GPU. Resources of the GPU, including the cache portions 410-413 are allocated to subsets of the SE 420-423 for storing frequently used information. The cache portions 410-413 are therefore part of the physical paths that are used to convey information from the FE circuitry to memory via the SE 420-423.

Figure 5:
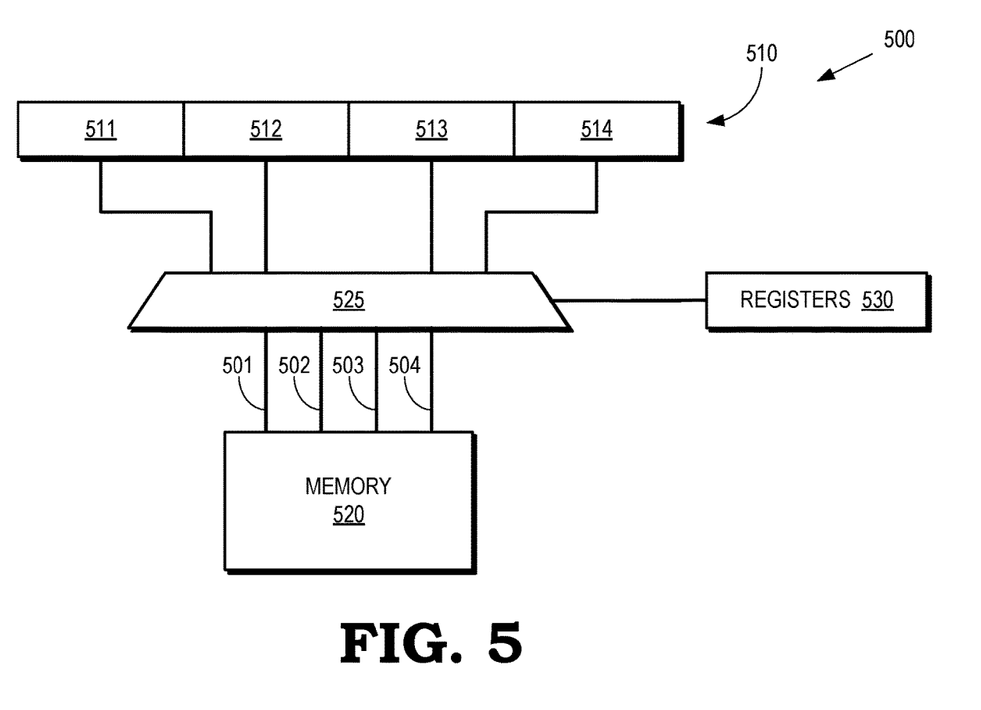
FIG. 5 is a block diagram of a portion of a GPU that includes a set of memory channels that are available for spatial partitioning according to some embodiments.

FIG. 5 is a block diagram of a portion 500 of a GPU that includes a set of memory channels that are available for spatial partitioning according to some embodiments. The portion 500 of the GPU is used to implement some embodiments of the GPU 105 shown in FIG. 1. Memory channels 501, 502, 503, 504 (collectively referred to herein as "the memory channels 501-504") are used to provide paths between a cache 510 that is available for partitioning into portions 511, 512, 513, 514 (collectively referred to herein as "the cache portions 511-514") and a memory 520. Switching circuitry 525 selectively connects subsets of the cache portions 511-514 to the memory 520 to form physical paths that are parts of the physical paths that include FE circuitry and SE, as discussed herein. The switching circuitry 525 is configured using information stored in the registers 530. In some embodiments, the registers 530 are programmed based on information in requests received from a CPU that is executing applications that generate commands for execution by the GPU. In the illustrated embodiment, each of the cache portions 511-514 are independently connected to the memory 520 by the switching circuitry 525. In some embodiments, the cache portions 511-514 are mapped to different portions of the memory 520, e.g., by writing information to memory locations indicated by different base addresses and a memory stride.

Figure 6:
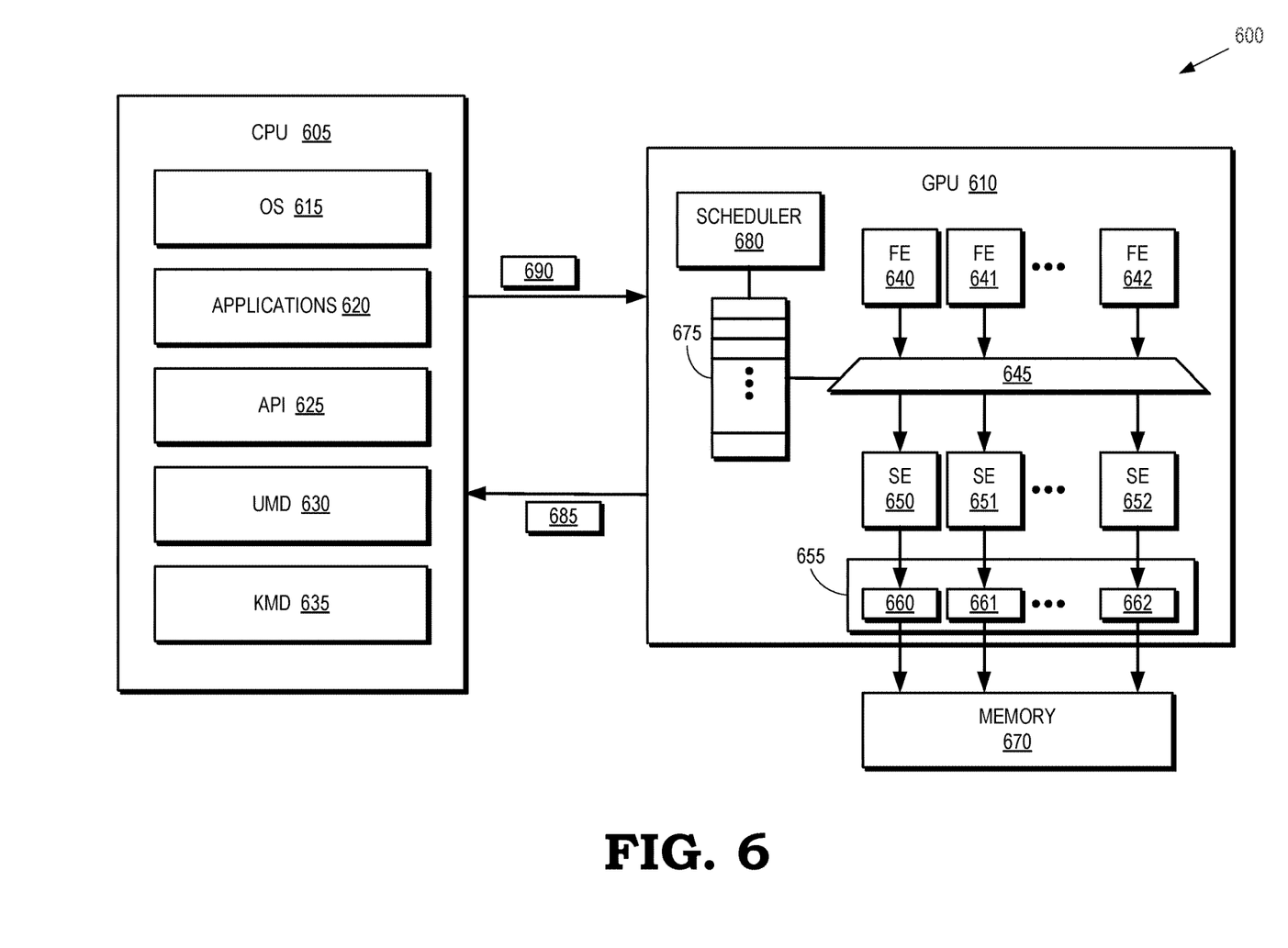
FIG. 6 is a block diagram of a processing system that includes a central processing unit (CPU) that executes applications to provide commands to a GPU according to some embodiments

FIG. 6 is a block diagram of a processing system 600 that includes a CPU 605 that executes applications to provide commands to a GPU 610 according to some embodiments. The processing system 600 is used to implement some embodiments of the processing system 100 shown in FIG. 1.

An operating system 615 is implemented on the CPU 105 to manage the hardware used to implement the processing system 600 and the software resources of the processing system 600. One or more applications 620 are executed by the CPU 605 using the hardware, firmware, or software resources of the CPU 105. In some embodiments, the applications 620 generate commands (or command buffers) that are provided to the GPU 610 for execution. For example, the applications 620 can include gaming applications that provide graphics commands to cause the GPU 610 to render graphics (or performing other general-purpose computing) for the gaming applications. As discussed herein, commands generated by multiple applications 620 can execute concurrently on the GPU 610.

In some embodiments, the applications 620 utilize an application programming interface (API) 625 to invoke a user mode driver 630 or other GPU driver. User mode driver 630 issues one or more commands (or command buffers) to the GPU 610. If the applications 620 issue graphics commands, the graphics commands instruct the GPU 610 to render one or more graphics primitives into displayable graphics images. Based on the graphics instructions issued by applications 620 to the user mode driver 630, the user mode driver 630 formulates one or more graphics commands that specify one or more operations for the GPU 610 to perform for rendering graphics. In some embodiments, the user mode driver 630 is a part of one or more of the applications 620 that are executing on the CPU 605. For example, a gaming application running on the CPU 605 can implement the user mode driver 630. Similarly, some embodiments of the operating system 615 implement a kernel mode driver 635 that executes when the CPU 605 is operating in a system or kernel mode.

The GPU 610 implements multiple reconfigurable paths for concurrently executing commands associated with different applications such as the applications 620 executing on the CPU 605. In the illustrated embodiment, the GPU 610 includes a set of front end (FE) circuits 640, 641, 642 (collectively referred to herein as "the FE circuits 640-642"), switching circuitry 645, a set of SE 650, 651, 652 (collectively referred to herein as "the SE 650-652"), and a shared cache 655 that is partitioned into portions 660, 661, 662 (collectively referred to herein as "the cache portions 660-662"). The GPU 610 also provides resources including a command bus having multiple lanes and a set of memory channels that interconnect the cache 655 with a memory 670, although these aspects of the GPU 610 are not shown in FIG. 6 in the interest of clarity. Although three independent paths are shown in FIG. 6, the GPU 610 is reconfigurable to support more or fewer paths, as discussed herein.

A set 675 of registers store information that is used to configure the multiple paths in the GPU 610. Some embodiments of the set 675 include the registers 335, 345 shown in FIG. 3, the registers 425 shown in FIG. 4, and the registers 530 shown in FIG. 5. A scheduler 680 receives commands (or command buffers) from the CPU 605 and schedules the commands (or command buffers) for execution by the SE 650-652 in corresponding paths. The scheduler 680 also programs the set 675 of registers with information that is used to configure and reconfigure the paths from the FE circuits 640-642 to the memory 670 via the SE 650-652.

The CPU 605 generates parameters that are used to configure or reconfigure the paths in the GPU 610. In some embodiments, the scheduler 680 provides an interrupt 685 (or other message) to inform the CPU 605 that a command (or command buffer) provided by one of the applications 620 has completed execution in the corresponding path. In response to receiving or detecting the interrupt 685, the CPU 605 determines parameters to reconfigure the paths in the GPU 610. The parameters are determined based on characteristics of the applications 620, changes in the characteristics of the applications 620, changes in the number or type of applications 620 that are concurrently executing on the CPU 605, and the like. In some embodiments, the characteristics include a number of applications 620, a complexity of the applications 620, a graphics resolution for the applications 620, and the like. For example, some of the applications 620 are high complexity applications that require high resolution such as 8K resolution, some of the applications 620 are medium complexity applications that require medium resolution such as 4K resolution, and some of the applications are low complexity applications that require low resolution such as 1080p resolution. The number and mix of high, medium, and low complexity/resolution applications changes over time. The CPU 605 provides the parameters 690 to the GPU 610.

In response to receiving the parameters 690, the GPU 610 determines how to reconfigure the paths based on the provided parameters 690. Some embodiments of the scheduler 680 program the set 675 of registers based on the provided parameters 690. The paths are then reconfigured based on the updated values in the set 675 of registers. For example, if the values of the parameters 690 indicate that the commands are being generated by a small number of higher complexity applications 620, the scheduler 680 programs the set 675 of registers to configure the GPU 610 to implement a smaller number of paths including additional SE 650-652 for each path. For another example, if the values of the parameters 690 indicate that the commands are being generated by a large number of lower complexity applications 620, the scheduler 680 programs the set 675 of registers to configure the GPU to implement a larger number of paths including fewer SE 650-652 for each path. The set 675 of registers is also used to modify allocation of the other resources that support the paths such as lanes of a command bus, portions of a cache, and memory channels.

Figure 7:
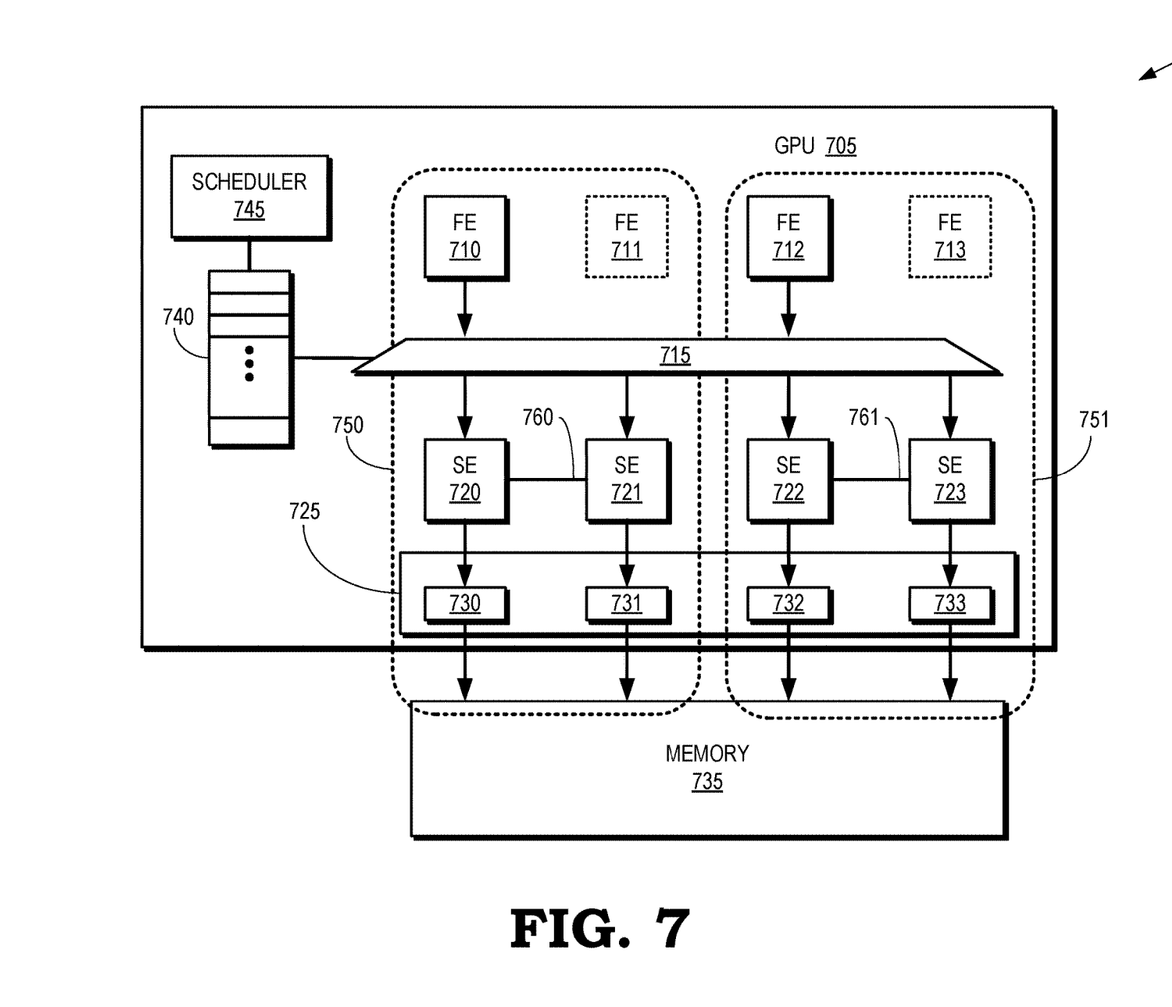
FIG. 7 is a block diagram of a processing system that includes a GPU that implements a first set of paths in a first configuration according to some embodiments.

FIG. 7 is a block diagram of a processing system 700 that includes a GPU 705 that implements a first set of paths in a first configuration according to some embodiments. The processing system 700 is used to implement some embodiments of the processing system 100 shown in FIG. 1 and the processing system 600 shown in FIG. 6. In the illustrated embodiment, the GPU 705 includes FE circuits 710, 711, 712, 713 (collectively referred to herein as "the FE circuits 710-713"), switching circuitry 715, a set of SE 720, 721, 722, 723 (collectively referred to herein as "the SE 720-723"), and a shared cache 725 that is partitioned into portions 730, 731, 732, 733 (collectively referred to herein as "the cache portions 730-733"). The cache portions 730-733 hold copies of frequently used information that is also stored in a memory 735. The GPU 705 is configured using information stored in a set 740 of registers that are programmed by a scheduler 745.

In the illustrated embodiment, the GPU 705 is spatially partitioned to support two paths 750, 751. Commands that are executed by the paths 750, 751 are scheduled by a corresponding FE circuit 710, 712. The other FE circuits 711, 713 are not used by the paths 750, 751, as indicated by the dashed boxes. The information in the set 740 of registers configures the switching circuitry 715 (as well as other resources of the GPU 705) to connect the FE circuit 710 in the first path 750 to the SE 720, 721 and to connect the FE circuit 712 in the second path 751 to the SE 722, 723. In some embodiments, the information in the set 740 of registers is also used to establish connections 760, 761 between the SE 720, 721 in the first path 750 and the SE 722, 723 in the second path 751, respectively. The connections 760, 761 are used to support inter-SE communication such as coordination of I/O operations, hand off, and the like. The first path 750 includes the cache portions 730, 731 and the second path 751 includes the cache portions 732, 733.

Figure 8:
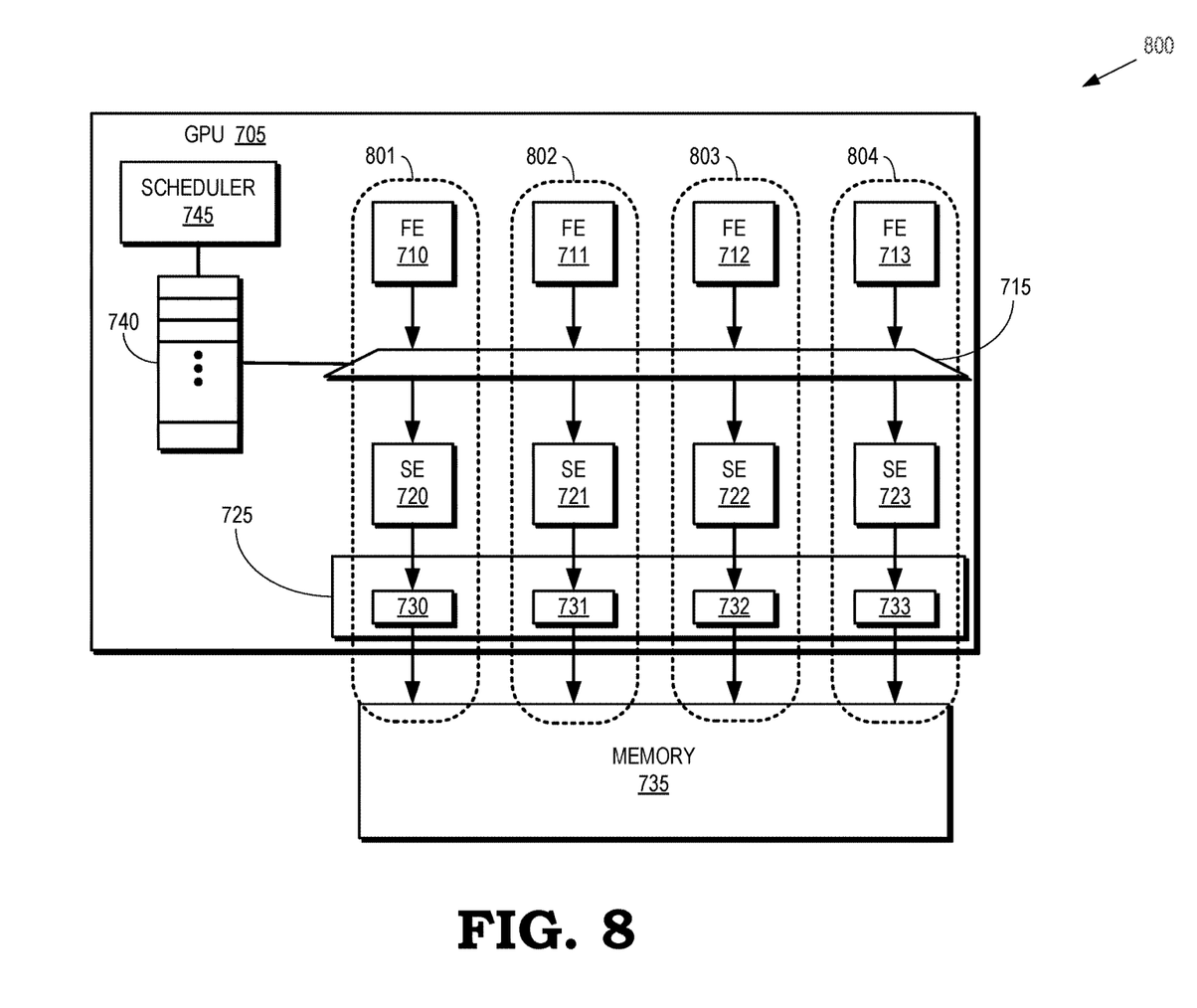
FIG. 8 is a block diagram of a processing system that includes the GPU that implements a second set of paths in a second configuration according to some embodiments.

FIG. 8 is a block diagram of a processing system 800 that includes the GPU 705 that implements a second set of paths in a second configuration according to some embodiments. The processing system 800 is used to implement some embodiments of the processing system 100 shown in FIG. 1 and the processing system 600 shown in FIG. 6. In the illustrated embodiment, the GPU 705 includes FE circuits 710, 711, 712, 713 (collectively referred to herein as "the FE circuits 710-713"), switching circuitry 715, a set of SE 720, 721, 722, 723 (collectively referred to herein as "the SE 720-723"), and a shared cache 725 that is partitioned into portions 730, 731, 732, 733 (collectively referred to herein as "the cache portions 730-733"). The cache portions 730-733 hold copies of frequently used information that is also stored in a memory 735. The GPU 705 is configured using information stored in a set 740 of registers that are programmed by a scheduler 745.

In the illustrated embodiment, the GPU 705 is spatially partitioned to support four paths 801, 802, 803, 804, which are collectively referred to herein as "the paths 801-804." Commands that are executed by the paths 801-804 are scheduled by a corresponding one of the FE circuits 710-713. The information in the set 740 of registers configures the switching circuitry 715 (as well as other resources of the GPU 705) to connect the FE circuit 710 in the first path 801 to the SE 720, the FE circuit 711 in the second path 802 to the SE 721, the FE circuit 712 in the third path 803 to the SE 722, and the FE circuit 713 in the fourth path 804 to the SE 723. In some embodiments, the information in the set 740 of registers is also used to tear down the connections 760, 761 between the SE 720, 721 in the first path 750 and the SE 722, 723 in the second path 751, respectively. For example, if the GPU 705 was previously in the first configuration shown in FIG. 7, reconfiguration of the GPU 705 based on the information in the set 740 of registers results in removal of the connections 760, 761. The first path 801 includes the cache portion 730, the second path 802 includes the cache portion 731, the third path 803 includes the cache portion 732, and the fourth path 804 includes the cache portion 733.

Although FIGS. 7 and 8 illustrate embodiments in which the SE 720-723 and the cache 725 are partitioned between multiple subsets of the FE circuits 710-713, in some embodiments a subset of the FE circuits 710-713 includes a single one of the FE circuits 710-713 or the FE circuits 710-713 are aggregated into a single entity. For example, if the GPU 705 is executing a single thread or application, a single entity including one of the FE circuits 710-713 or the aggregated FE circuits 710-713 are allocated to handle the single thread or application. In that case, the subset of the FE circuits 710-713 includes a single circuit and the resources of the SE 720-723 and the cache 725 are allocated to the single circuit so that the resources of the GPU 705 are fully utilized regardless of the number of subsets of the FE circuits 710-713.

Figure 9:
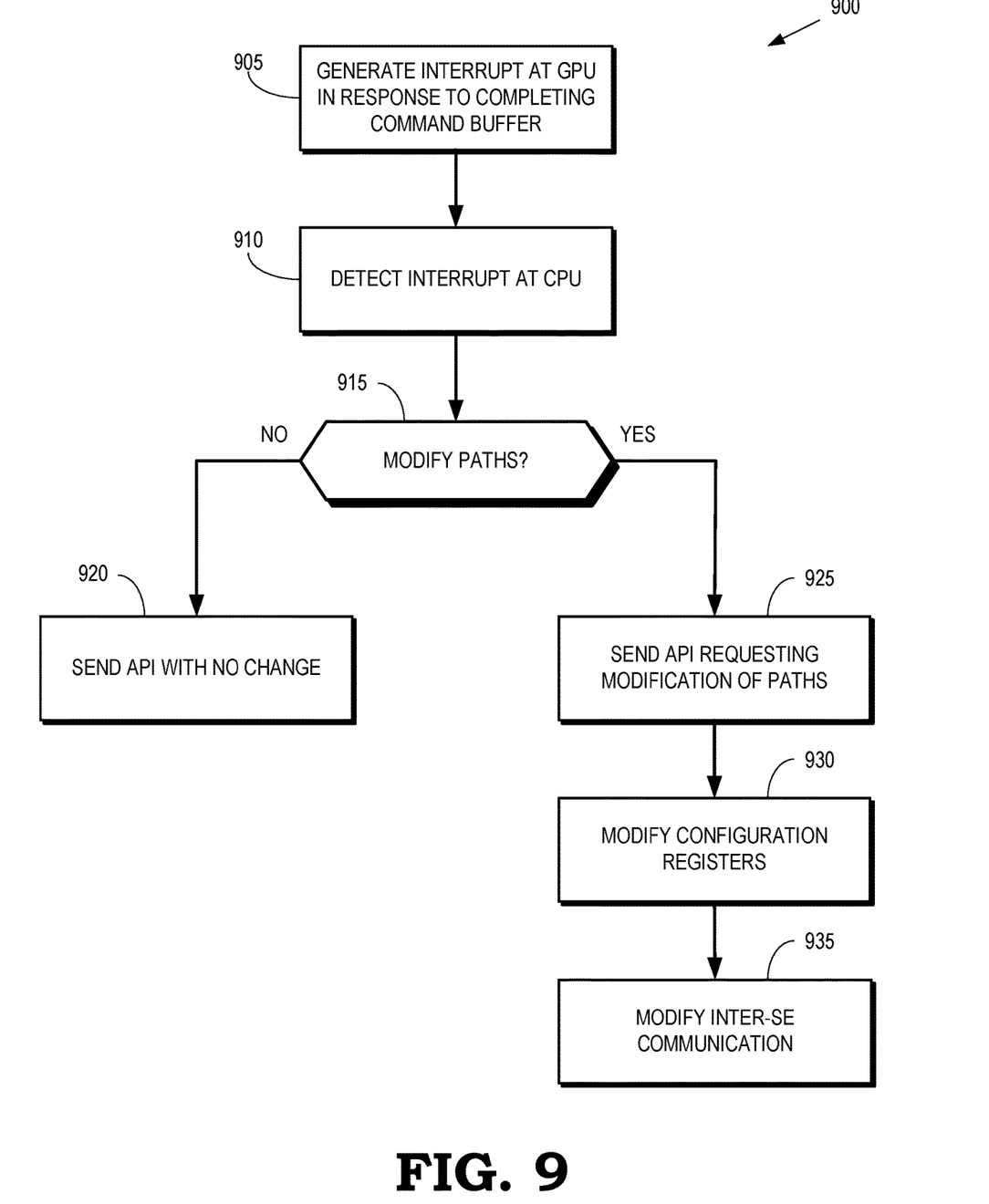
FIG. 9 is a flow diagram of a method of performing dynamic transparent reconfiguration of a GPU according to some embodiments.

FIG. 9 is a flow diagram of a method 900 of performing dynamic transparent reconfiguration of a GPU according to some embodiments. The method 900 is implemented in some embodiments of the processing system 100 shown in FIG. 1 and the processing system 600 shown in FIG. 6.

At block 905, the GPU generates an interrupt (or other message) in response to completing a command or command buffer associated with an application that is executing on a corresponding CPU. In some embodiments, the application is executing concurrently on the CPU with other applications that are also generating commands or command buffers for execution on the GPU.

At block 910, the CPU detects the interrupt (or receives the other message) that indicates that the command or command buffer has completed execution on the GPU. In response to detecting the interrupt, the CPU can change the mix of applications that are concurrently executing. For example, the CPU can add one or more additional applications for concurrent execution or remove one or applications from concurrent execution. In some embodiments, the characteristics of the applications executing concurrently on the CPU changes in response to the GPU completing execution of the command or command buffer. Applications having a higher complexity or graphics resolution requirement can begin execution, applications having a lower complexity or graphics resolution requirement can begin execution, or other changes in the characteristics of the concurrently executing applications can occur.

At decision block 915, the CPU determines whether to modify paths from the FE circuits in the GPU to a memory via the SE that execute the commands or command buffers that the CPU provides to the GPU. The determination is made based upon the characteristics, or the change in the characteristics, of the applications that are concurrently executing on the CPU and generating commands or command buffers for the GPU. If the CPU determines that no modifications are necessary, the method 900 flows to block 920. If the CPU determines that modifications are necessary, the method 900 flows to block 925.

At block 920, the CPU sends an API packet indicating no change to the configuration of the paths in the GPU. Alternatively, the CPU can take no action at the block 920, which also results in the GPU maintaining its current configuration of paths.

At block 925, the CPU sends an API packet requesting modification of the paths in the GPU. Some embodiments of the API packet include information identifying applications that are running concurrently on the CPU, as well as information indicating characteristics of the applications. Alternatively, the API packet can include information requesting a number of paths that are to be allocated to concurrent applications. In either case, the GPU is responsible for determining how to reconfigure the paths based on the information in the API packet.

At block 930, the GPU modifies configuration registers that are used to configure the paths in the GPU. Some embodiments of the GPU include a scheduler that determines how the values of entries in the configuration registers are to be modified based on information received from the CPU in the API packet. The scheduler then programs the configuration registers with the determined values.

At block 935, the GPU determines whether communication between SE in the GPU should be modified. For example, if one or more interconnections exist to support inter-SE communication, one or more of the connections are torn down if the SE that communicate via the connections are allocated to different paths as part of the reconfiguration. For another example, connections are established to support inter-SE communication if two or more SE are allocated to the same path as part of the reconfiguration.

A computer readable storage medium includes any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. Some embodiments of the computer readable storage medium are embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above are implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium are in source code, assembly language code, object code, or other instruction format that is interpreted or otherwise executable by one or more processors.

Note that not all of the activities or elements described above in the general description are required, that a portion of a specific activity or device might not be required, and that one or more further activities could be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes could be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that cause any benefit, advantage, or solution to occur or become more pronounced are not to be construed as a critical, required, or essential feature of any or all the claims. Moreover, the particular embodiments disclosed above are illustrative only, as the disclosed subject matter could be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above could be altered or modified and all such variations are considered within the scope of the disclosed subject matter. Accordingly, the protection sought herein is as set forth in the claims below.

What is claimed is:
1. An apparatus comprising:
    a set of shader engines;

a set of front end (FE) circuits, wherein subsets of the set of FE circuits are configured to schedule commands for execution on corresponding subsets of the set of shader engines;

a set of physical paths configured to convey information from the set of FE circuits to a memory via the set of shader engines, wherein subsets of the set of physical paths are allocated for exclusive use by the subsets of the set of FE circuits and the corresponding subsets of the set of shader engines; and a scheduler configured to receive a reconfiguration request and to modify allocation of one or more of the subsets of the set of physical paths based on the reconfiguration request.

2. The apparatus of claim 1, wherein the scheduler is configured to receive the reconfiguration request in a first packet from a central processing unit (CPU) that is executing at least one first application to generate the commands for execution on the corresponding subsets of the set of shader engines.

3. The apparatus of claim 2, wherein the scheduler is configured to transmit a second packet indicating completion of execution of at least one of the commands, and wherein the scheduler is configured to receive the first packet in response to transmitting the second packet.

4. The apparatus of claim 3, wherein the reconfiguration request includes information generated by the CPU based on characteristics of the at least one first application and at least one second application that is to be subsequently executed by at least one of the set of shader engines.

5. The apparatus of claim 1, further comprising:
a set of registers configured to store information that configures the set of physical paths, wherein the scheduler is configured to program the set of registers based on the reconfiguration request.

6. The apparatus of claim 5, further comprising:
a command bus that implements a set of lanes, wherein the scheduler is configured to allocate subsets of the set of lanes to the subsets of the set of physical paths;
a cache that is shared by the set of shader engines, wherein the scheduler is configured to partition the cache into portions that are allocated to the subsets of the set of physical paths; and
a data fabric that supports a set of memory channels between the cache and the memory, wherein the scheduler is configured to allocate subsets of the set of memory channels to the subsets of the set of physical paths.

7. The apparatus of claim 6, wherein the set of registers comprises:
a first subset of the set of registers configured to store information indicating a mapping of the subsets of the FE circuits to the corresponding subsets of the shader engines;
a second subset of the set of registers configured to store information indicating the allocation of the subsets of the set of lanes of the command bus to the subsets of the set of physical paths;
a third subset of the set of registers to store information indicating the allocation of the portions of the cache to the subsets of the set of physical paths; and
a fourth subset of the set of registers to store information indicating the allocation of the subsets of the set of memory channels to the subsets of the physical paths.

8. The apparatus of claim 7, wherein the scheduler is configured to modify allocations of the subsets of the set of lanes, the portions of the cache, and allocations of the subsets of the set of memory channels based on the reconfiguration request.

9. A method comprising:
receiving a reconfiguration request indicating a modification to one or more subsets of a set of physical paths that convey information from a set of front end (FE) circuits to a memory via a set of shader engines, wherein subsets of the set of FE circuits are configured to schedule commands for execution on corresponding subsets of the set of shader engines;
modifying allocation of the set of physical paths to applications that are generating the commands for execution on the corresponding subsets of the set of shader engines by exclusively allocating subsets of the set of physical paths for use by the corresponding subsets of the set of FE circuits; and
dispatching the commands from the subsets of the set of FE circuits to the corresponding subsets of the set of shader engines via the modified allocation of the set of physical paths.

10. The method of claim 9, wherein receiving the reconfiguration request comprises receiving the reconfiguration request in a first packet from a central processing unit (CPU) that is executing the applications to generate the commands for execution on the corresponding subsets of the set of shader engines.

11. The method of claim 10, further comprising:
transmitting a second packet indicating completion of execution of at least one of the commands; and
receiving the first packet in response to transmitting the second packet.

12. The method of claim 11, further comprising:
executing first commands for a first application on a first subset of the set of shader engines associated with a first subset of the set of physical paths and second commands for at least one second application on at least one second subset of the set of shader engines associated with at least one second subset of the set of physical paths;
transmitting the second packet in response to the first subset of the set of shader engines completing execution of the first commands; and
receiving the first packet including information indicating a modification of the allocation of the set of physical paths to support the at least one second application and at least one third application.

13. The method of claim 12, further comprising:
modifying the allocation of the set of physical paths from a first allocation for the first application and the at least one second application to a second allocation for the at least one second application and the at least one third application.

14. The method of claim 13, wherein the first packet includes information generated by the CPU based on characteristics of the at least one second application and the at least one third application.

15. The method of claim 9, wherein modifying the allocation of the set of physical paths comprises programming, based on the reconfiguration request, a set of registers configured to store information that configures the set of physical paths.

16. The method of claim 15, wherein programming the set of registers comprises:

programming a first subset of the set of registers configured to store information that maps the subsets of the FE circuits to the corresponding subsets of the shader engines;

programming a second subset of the set of registers configured to store information indicating allocation of subsets of a set of lanes of a command bus to the subsets of the set of physical paths;

programming a third subset of the set of registers to store information indicating allocation of portions of a cache to the subsets of the set of physical paths; and programming a fourth subset of the set of registers to store information indicating allocation of subsets of a set of memory channels to the subsets of the physical paths.

17. A first processing unit comprising:
at least one application to generate commands for execution on a second processing unit that comprises:
  a set of shader engines,
  a set of front end (FE) circuits, wherein subsets of the set of FE circuits are configured to schedule commands for execution on corresponding subsets of the set of shader engines, and
  a set of physical paths configured to convey information from the set of FE circuits to a memory via the set of shader engines, wherein subsets of the set of physical paths are allocated for exclusive use by the subsets of the set of FE circuits and the corresponding subsets of the set of shader engines;
an operating system (OS) configured to modify allocation of one or more of the subsets of the set of physical paths in the second processing unit in response to a request for reconfiguration of the second processing unit; and
an application programming interface (API) configured to transmit the request for the reconfiguration of the second processing unit.

18. The first processing unit of claim 17, wherein the API is configured to receive a first packet including information indicating that the second processing unit has completed execution of at least one of the commands.

19. The first processing unit of claim 18, wherein the OS is configured to determine the reconfiguration of the set of physical paths in response to receiving the first packet.

20. The first processing unit of claim 19, wherein the at least one application comprises a first application and at least one second application, and wherein the first packet indicates that the second processing unit has completed execution of commands for the first application.

21. The first processing unit of claim 20, wherein the OS is configured to select at least one third application for concurrent execution with the at least one second application on the second processing unit in response to receiving the first packet.

22. The first processing unit of claim 21, wherein the OS is configured to determine the reconfiguration of the set of physical paths based on characteristics of the at least one second application and the at least one third application.

23. The first processing unit of claim 22, wherein the API is configured to transmit the request for the reconfiguration of the second processing unit prior to initiating concurrent execution of commands for the at least one second application and the at least one third application on the second processing unit.

* * * * *